July 12, 1960 D. CLEJAN 2,944,492
RAILWAY CARS FOR TRANSPORTING ROAD VEHICLES
Filed June 26, 1956 4 Sheets-Sheet 1
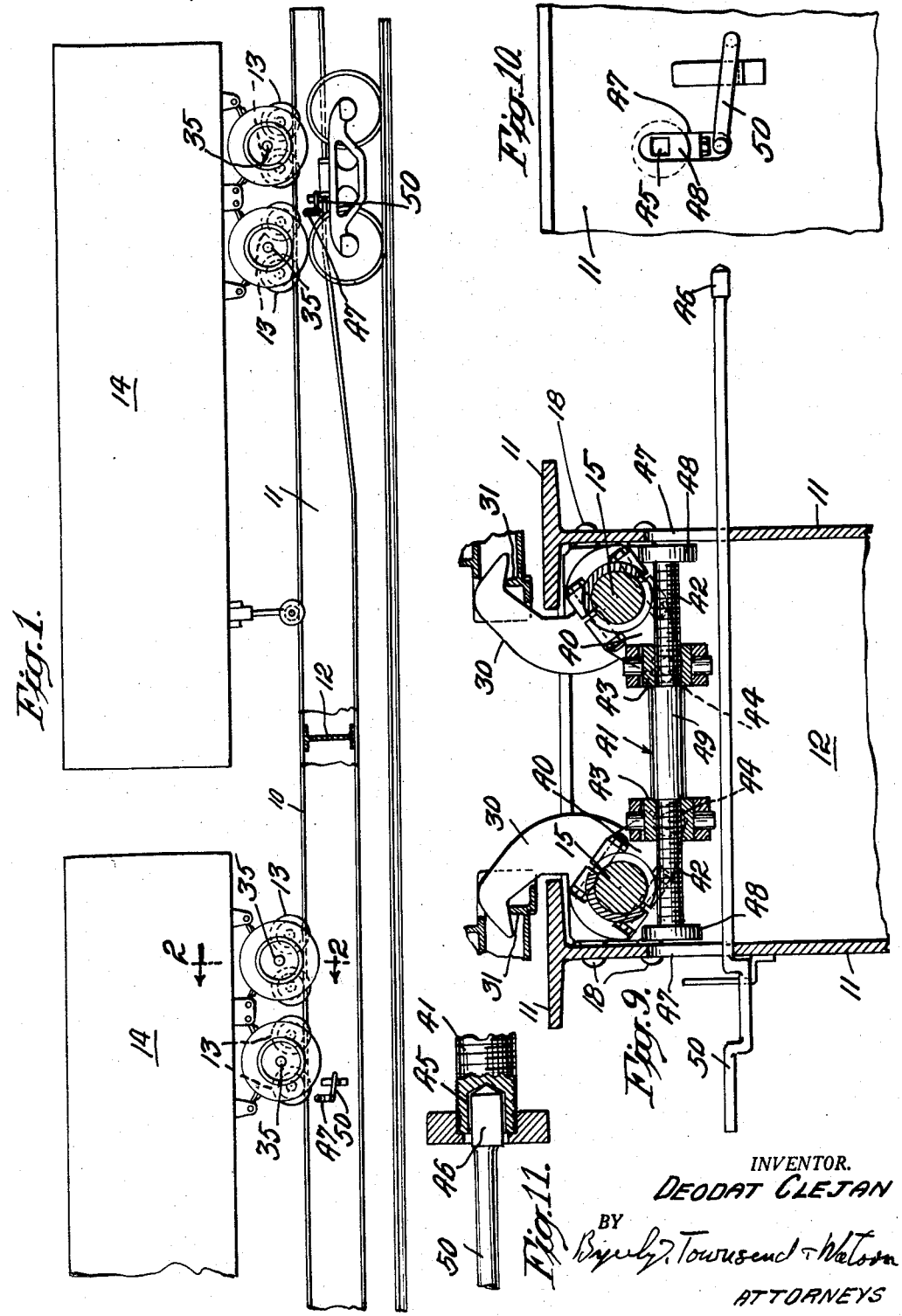
INVENTOR.
DEODAT CLEJAN
BY
Byerly, Townsend & Watson
ATTORNEYS

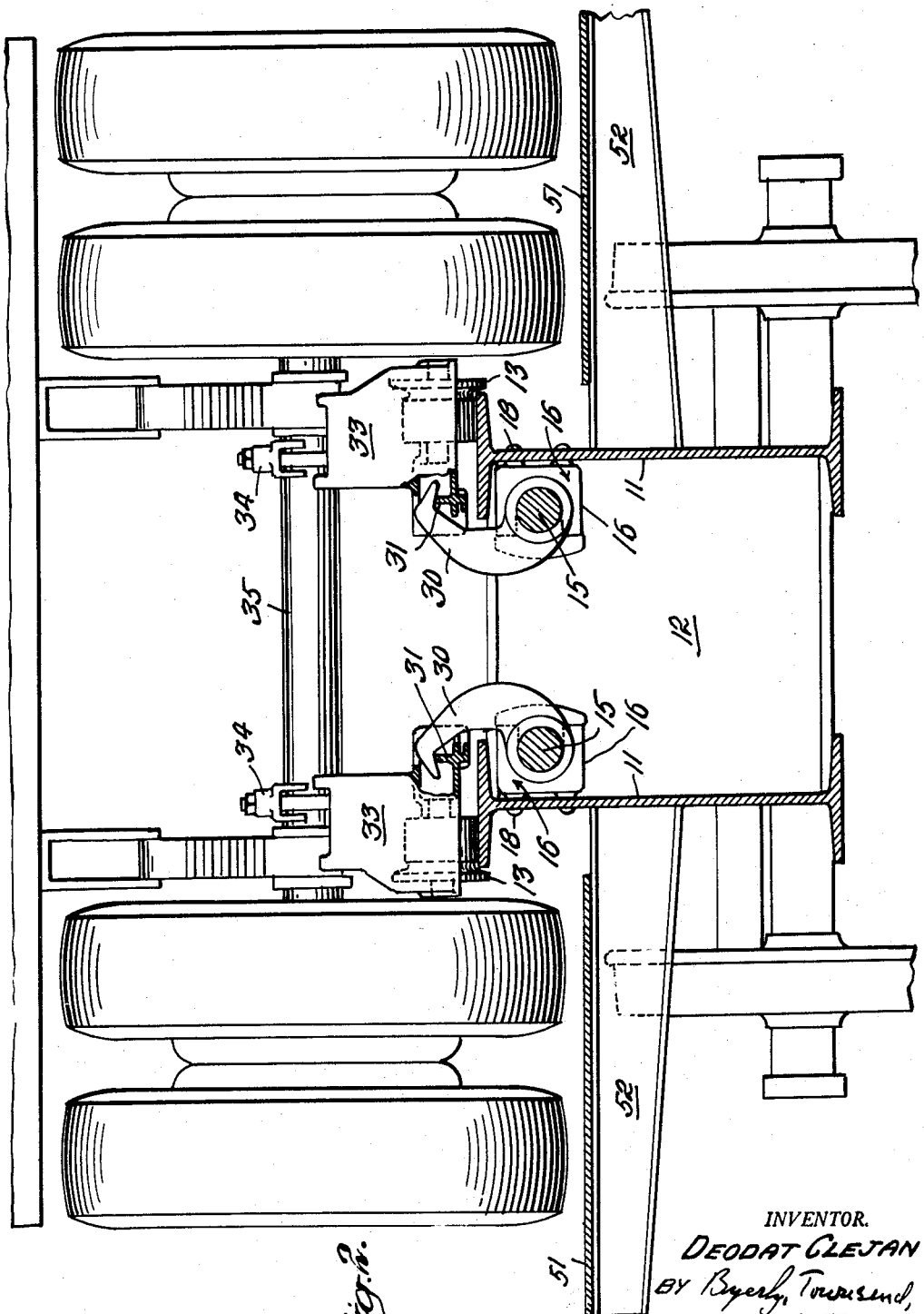

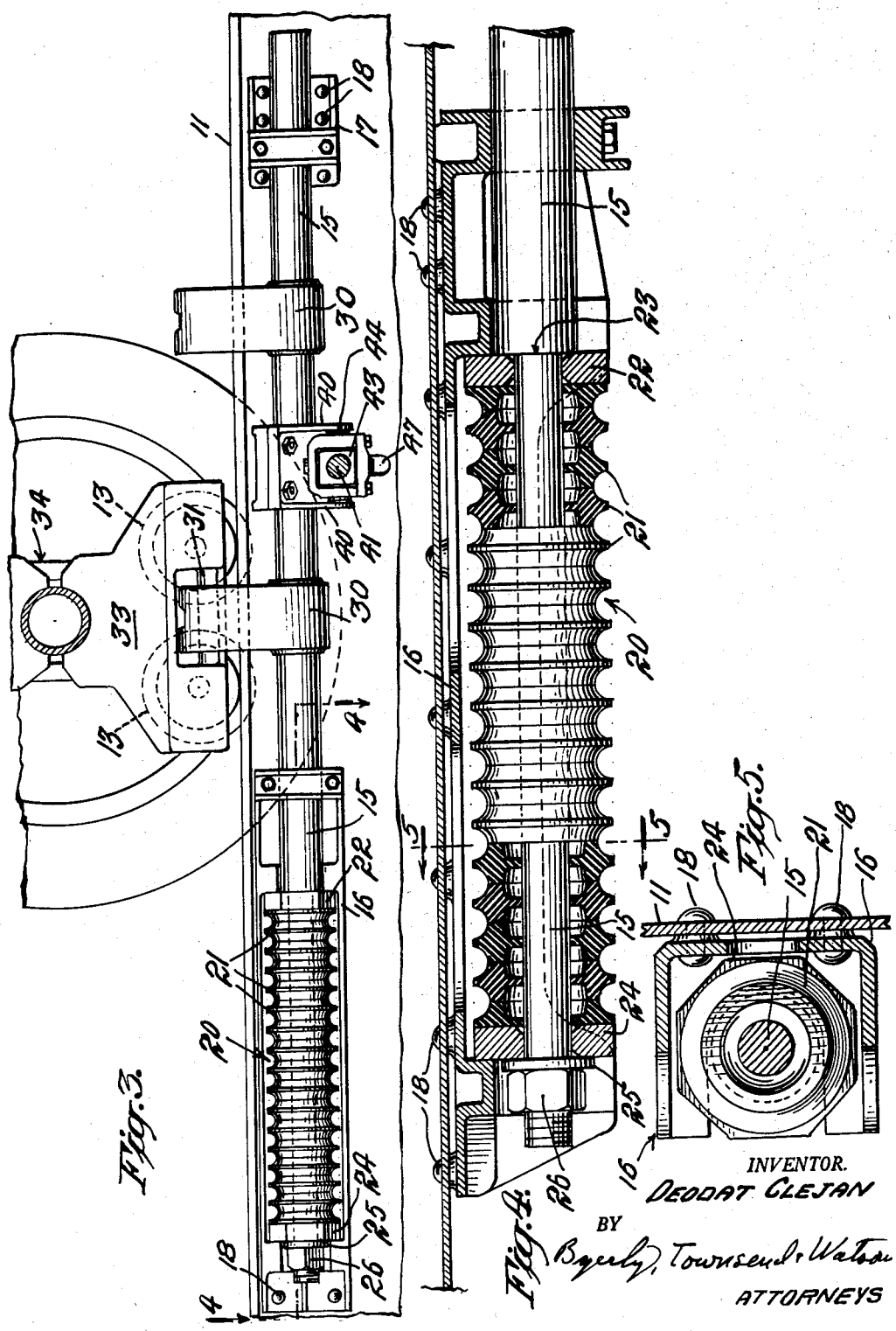

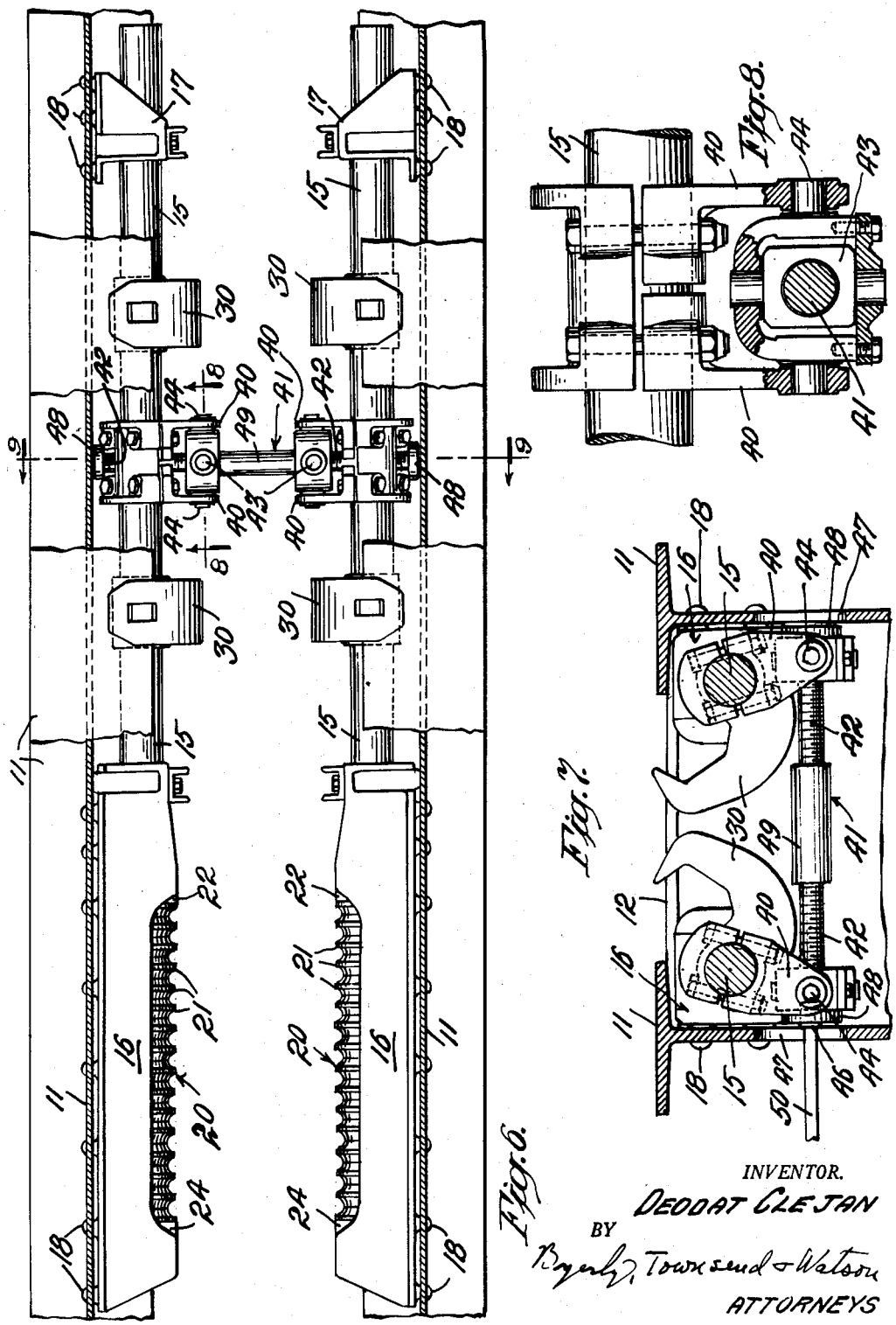

United States Patent Office 2,944,492
Patented July 12, 1960

2,944,492
RAILWAY CARS FOR TRANSPORTING ROAD VEHICLES

Deodat Clejan, New York, N.Y., assignor, by mesne assignments, to General American Transportation Corporation, Chicago, Ill., a New York corporation Filed June 26, 1956, Ser. No. 593,848

7 Claims. (Cl. 105—368)

This invention relates to improvements in railway cars for transporting road vehicles or other rolling loads, and aims particularly to provide a freight car with means for securely retaining a road vehicle or wheeled container thereon and protecting it from longitudinal shocks.

A freight car embodying the present invention has mounted in its frame two longitudinally cushioned shafts carrying engaging means or hooks for engaging and holding down a road vehicle which has wheels resting on the freight car. The hooks or engaging means are operated by applying relative outward turning force to the shafts by a mechanism engaging both shafts but independent of the frame of the car so that the hook on each shaft engages the rolling load firmly despite lack of symmetry in the parts of the freight car or the road vehicle.

Although the invention may advantageously be applied to various types of freight cars, I shall, for the sake of illustration, describe its application to the type of freight car whose frame is a center sill whose upper edges provide a track for supporting auxiliary flanged wheels mounted on a road vehicle or container.

The accompanying drawings show the application of the invention to such a car and such a road vehicle:

Fig. 1 is a side view of a railway car embodying the invention showing two road vehicles, specifically semi-trailers, mounted on the car;

Fig. 2 is an enlarged transverse section on the line 2—2 of Fig. 1 showing the running gear of a road vehicle resting on the center sill of a railway car;

Fig. 3 is a fragmentary enlarged side elevation sectioned on the center line or axis of the railway car;

Fig. 4 is a horizontal section on the line 4—4 of Fig. 3;

Fig. 5 is a transverse section on the line 5—5 of Fig. 4;

Fig. 6 is a plan view of a part of the center sill of the railway car with parts of the upper flange of the I-beam broken away;

Fig. 7 is a transverse section at the line 9—9 of Fig. 6 showing the hooks and operating mechanism in released position;

Fig. 8 is an enlarged section on the line 8—8 of Fig. 6;

Fig. 9 (on Sheet 1) is a transverse section on the line 9—9 of Fig. 6 showing the hooks and the hook-operating mechanism in holding position;

Fig. 10 is a fragmentary side elevation of parts shown in Fig. 9; and

Fig. 11 is a sectional detail showing the application of a crank rod to the threaded operating bar.

Referring now to Fig. 1 of the drawings, there is shown a road-and-rail transportation system comprising a skeleton railway car 10 carrying two road vehicles 14; and as illustrated, each of the road vehicles 14 is in the form of a semi-trailer.

The railway car 10 has a frame consisting of a center sill composed of two longitudinal I-beams 11 connected by transverse beams 12; which center sill is supported at the opposite ends thereof by a pair of four-wheeled trucks carried by an associated main railway track. The upper outer flanges of the I-beams 11 form the respective rails of an auxiliary track which may be used to support auxiliary flanged wheels 13 secured to the rear axles of the trailers 14 or other rolling freight carriers.

For the convenience of trainmen, catwalks 51 may be provided at the sides of the center sill of the railway car 10; which catwalks 51 are shown only in Fig. 2. The catwalks 51 may be supported on small transverse beams 52 secured to and extending outwardly from the webs of the I-beams 11 of the center sill. These beams 52 and the catwalks 51 are not used to support the road vehicles 14 carried by the car 10. As shown in Fig. 2, the road wheels of the road vehicle 14 are disposed well above the catwalks 51.

A pair of longitudinal shafts 15 are mounted for longitudinal and rotary movement under the inner upper flanges of the respective I-beams 11. Bearings for the shafts 15 are provided in long housings 16 and brackets 17 secured to the respective I-beams 11 by rivets 18.

Each shaft 15 is connected at one or both of its ends to a cushioning device or shock absorber 20 located in one of the housings 16, as illustrated in Figs. 3 and 4. In the form shown, the shock absorber 20 consists of a series of rubber mats or pads 21 enclosed between an octagonal plate 22 bearing against a shoulder 23 on the shaft 15 and an octagonal plate 24 bearing against a washer 25 held by a nut 26 screwed on the extreme end of the shaft 15. It is apparent that the shock absorber as described will cushion movements of the shaft 15 in each direction.

Each shaft 15 is provided with a number of holding devices or hooks 30 fixed onto it. The hooks 30 face outwardly so that, when the two shafts 15 are turned outwardly, the hooks are brought into engagement with parts 31 of a road vehicle having wheels resting on the car. As shown in the drawings, the road vehicle 14 has auxiliary flanged wheels 13 which rest on the I-beams as shown in Figs. 2 and 3. In the form shown, the parts 31 are formed on an auxiliary two-wheel carriage 33 which is attached by clamps 34 to the axle 35 of the running gear of the road vehicle. So far as the present invention is concerned, the parts 31 may be formed directly on the running gear of the road vehicle or on any attachment to it which is so located that the parts 31 may be engaged by the hooks 30 when the wheels 13 of the road vehicle 14 are resting on the railway car 10 in the position in which the vehicle is to be transported.

In accordance with the present invention, a new type of operating mechanism for the hooks 30 is provided. This mechanism causes relative outward turning of the two shafts 15. The mechanism engages both shafts 15 but is independent of the frame of the car so that the two hooks 30 seat themselves firmly in spite of any slight lack of symmetry in the relation between the hooks and the frame or the hooks and the road vehicle.

The operating mechanism for the hooks consists of radial arms 40 fixedly mounted on the shafts 15 in any convenient location. The arms 40 on the two shafts are inclined inwardly and downwardly when the hooks are in their holding position as shown in Fig. 9. The lower ends of the two arms 40 are connected by a mechanically contractible and extensible mechanism which is free from connection with the car. When this mechanism is contracted so as to draw the lower ends of the arms 40 towards each other, the two shafts 15 are turned or rotated outwardly so as to bring the two hooks 30 into engagement with the parts 31, as shown in Fig. 9.

The particular extensible and contractible connection between the arms 40 which is shown in the drawings consists of a transverse shaft 41 having oppositely inclined threads 42 on its two end portions. On these threads are screwed nuts 43 that are connected by means of gimbals 44 to the lower ends of the arms 40. The shaft 41 is suspended between the vertical webs of the two I-beams 11 without engaging either of them.

To provide for operating the connecting mechanism, the shaft 41 has at each end a square socket 45 which can be engaged by a square head 46 on the end of a crank rod 50 (Figs. 7, 10, 11). Access to the square socket 45 is provided by vertical slots 47 in the central webs of the I-beams 11. Discs 48 fixed on the ends of the shaft 41 prevent excessive endwise movement of the shaft 41 by engaging the inner surface of one or the other I-beam.

When a road vehicle is to be rolled upon the freight car, the hooks 30 are turned inward to a lowered position as shown in Fig. 7 and the vehicle is placed with its parts 31 opposite to a pair of the hooks. The shaft 41 is then turned by means of the crank rod 50 in the direction which moves the nuts 43 inward. This raises the cross-shaft 41 and at the same time turns the lower ends of the arms 40 inward so as to swing the hooks 30 outward into engagement with the parts 31 as shown in Fig. 9. This secures the vehicle 14 to the car 10.

After this has been done, the crank rod 50 is disengaged from the socket in the end of the cross-shaft 41 and is extended between the two I-beams directly under the shaft 41 as shown in Fig. 9. The crank rod 50 in this position blocks downward movement of the across shaft 41 and thus blocks the release of the contracting mechanism, but it is out of contact with the shaft 41 so that it does not interfere with the fore and aft movement of the shafts 15 and the suspended cross-shaft 41 permitted by yielding of the shock absorbers 20.

When the road vehicle 14 is to be removed from the railway car 10, the crank rod 50 is removed from its position below the cross-shaft 41 and used to turn the cross-shaft in a direction to move the nuts 43 outwardly, lowering the shaft 41 and separating the arms 40 to turn the hooks 30 inward to the positions shown in Fig. 7 so that the hooks 30 do not interfere with rolling movement of the vehicle 14.

It is, of course, important that the operating mechanism be not turned backward after the hooks 30 have been engaged, as this would release the road vehicle 14 during the running of the railway car 10. Any substantial back turning is blocked by the crank rod 50 as described above. The following means prevent even initial back turning of the operating mechanism:

The threads 42 are made so steep that pressure on the nuts 43 will not turn the shaft 41.

A sleeve 49 surrounds the middle portion of the shaft 41 so that the nuts 43 may be forced inwardly against the ends of this sleeve when the shaft 41 is turned to engage the hooks 30, as shown in Fig. 9. The tightening of the nuts 43 against the ends of the sleeve 49 tends to prevent any reverse turning of the nuts.

The hexagonal discs 22, 24 cannot turn within the housing 16 so that turning of each shaft 15 is opposed by the friction between the washer 25 and the disc 24 and between the shoulder 23 and the disc 22. This friction can be made as great as desired by tightening the nut 26 to precompress the rubber pads 21.

By virtue of the use of these expedients, all danger of a loosening of the hooks 30 during the operation of the railway car 10 is avoided.

While there has been described what is at present considered to be the preferred embodiment of the invention, it will be understood that various modifications may be made therein, and it is intended to cover in the appended claims all such modifications as fall within the true spirit and scope of the invention.

What I claim is:

1. A railway car for transporting freight carriers, and comprising a longitudinally extending frame adapted to support a freight carrier, two substantially parallel longitudinally extending and laterally spaced-apart shafts arranged in said frame and each mounted thereon for both rotational and longitudinal sliding movements with respect thereto, a pair of upwardly projecting hooks respectively mounted on said shafts for movements therewith, a pair of downwardly projecting arms respectively mounted on said shafts for movements therewith, a pair of nuts, a pair of gimbals respectively connecting said nuts to the lower ends of said arms, a laterally extending member suspended between said nuts and independently of said frame and having oppositely inclined threads at its opposite end portions which are respectively engaged by said nuts, and means for selectively rotating said laterally extending member in either direction, rotation of said laterally extending member in one direction effecting drawing of the lower ends of said arms toward each other so as to impart first relative rotation to said shafts and rotation of said laterally extending member in the opposite direction effecting forcing of the lower ends of said arms away from each other so as to impart second relative rotation to said shafts, said first relative rotation of said shafts actuating said hooks into holding positions with respect to a freight carrier supported by said frame and said second relative rotation of said shafts actuating said hooks into releasing positions with respect to a freight carrier supported by said frame.

2. The railway car set forth in claim 1, and further comprising a pair of outer stops respectively carried on the outer ends of said laterally extending member for respectively limiting the outward travels of said nuts, and a pair of inner stops carried on the intermediate portion of said laterally extending member for respectively limiting the inward travels of said nuts.

3. The railway car set forth in claim 1, wherein said frame has an opening extending laterally therethrough and disposed below said laterally extending member, and further comprising an elongated rod that is adapted to be manually projected laterally into said opening extending laterally through said frame and into a supported position in said frame and in interfering relation with said nuts, so as to prevent alteration of the adjusted positions of said nuts upon the respective opposite ends of said laterally extending member.

4. A railway car comprising a longitudinally extending center sill, a pair of trucks supporting the opposite ends of said center sill and each carrying main track wheels, said center sill being hollow and also substantially narrower than said trucks so that the opposite sides thereof are disposed well inwardly with respect to said main track wheels, means providing a longitudinally extending auxiliary track on top of said center sill and adapted to engage cooperating rollers carried by an associated freight carrier so as to mount the freight carrier upon said center sill, a pair of longitudinally extending and laterally spaced-apart shafts arranged in said center sill and each mounted thereon for both rotational and longitudinal sliding movements, a pair of laterally spaced-apart and aligned arms respectively carried by said shafts, a laterally extending member interconnecting said arms and rotatably supported thereby independently of said center sill, mechanism responsive to rotation of said member in one direction for forcing said arms toward each other so as to impart a first relative rotation to said shafts and responsive to rotation of said member in the opposite direction for forcing said arms away from each other so as to impart a second relative rotation to said shafts, attachment means respectively carried by said shafts and having active and inactive positions, said attachment means in their active and inactive positions respectvely engaging and disengaging a freight carried mounted upon said center sill so as respectively to hold and to release the freight carrier with respect to said center sill, said attachment means being moved toward their active positions in response to said first relative rotation of said shafts and being moved toward their inactive positions in response to said second relative rotation of said shafts, and cushioning means respectively connecting said shafts to said center sill and respectively effecting double-acting cushioning of longitudinal sliding movements of said shafts so as to accommodate cushioned limited rolling movements of a freight carrier mounted upon said center sill.

5. The railway car set forth in claim 4, wherein said attachment means in their active positions are disposed above the top of said center sill and in their inactive positions are disposed below the top of said center sill.

6. A railway car comprising a longitudinally extending hollow center sill, a pair of trucks supporting the opposite ends of said center sill and each carrying main track wheels, said center sill being substantially narrower than said trucks so that the opposite sides thereof are disposed well inwardly with respect to said main track wheels, a pair of longitudinally extending and laterally spaced-apart rails provided by the top of said center sill respectively adjacent to the opposite sides thereof and constituting an auxiliary track that is adapted to engage and to support cooperating rollers carried by an associated removable freight carrier so as to accommodate mounting thereof upon said center sill, a pair of longitudinally extending and laterally spaced-apart shafts arranged in said center sill and each mounted thereon for both rotational and longitudinal sliding movements, said shafts being rotatable in first related directions with respect to each other into active positions and being rotatable in second related directions with respect to each other into inactive positions, attachment means respectively carried by said shafts and respectively rotatable therewith between corresponding active and inactive positions, said attachment means in their active positions being disposed above the top of said center sill and being adapted to engage and to connect thereto the opposite undersides of the freight carrier mounted upon said center sill and said attachment means in their inactive positions being disposed below the top of said center sill and being adapted to disengage and to disconnect therefrom the opposite undersides of the freight carrier mounted upon said center sill, mechanism means respectively carried by said shafts, a laterally extending member rotatably supported jointly by said mechanism means and independently of said center sill, said mechanism means being responsive to rotation of said laterally extending member in one direction for imparting to said shafts simultaneous rotations thereof in said first related directions and responsive to rotation of said laterally extending member in the opposite direction for imparting to said shafts simultaneous rotations thereof in said second related directions, and two-way cushioning means connecting said shafts and said center sill so as to resist and to cushion longitudinal sliding movements of said shafts and thus fore-and-aft rolling movements of the freight carrier mounted upon said center sill and connected to said shafts.

7. The railway car set forth in claim 6, wherein said attachment means in their active positions respectively project over the tops of said rails and are also adapted to exert respective downward clamping actions with respect to said rails upon the respectively engaged and connected opposite undersides of the freight carrier mounted upon said center sill.

References Cited in the file of this patent

UNITED STATES PATENTS

| | | |
|---|---|---|
| 1,649,598 | Kirchner | Nov. 15, 1927 |
| 2,047,954 | Fitch | July 21, 1936 |
| 2,072,988 | Kellett | Mar. 9, 1937 |
| 2,128,364 | Kellett | Aug. 30, 1938 |
| 2,166,948 | Fitch | July 25, 1939 |
| 2,172,154 | Perin | Sept. 5, 1939 |
| 2,574,420 | Seddon | Nov. 6, 1951 |
| 2,665,902 | Allen | Jan. 12, 1954 |
| 2,699,735 | Williams | Jan. 18, 1955 |
| 2,705,634 | Sampson et al. | Apr. 5, 1955 |

FOREIGN PATENTS

| | | |
|---|---|---|
| 1,114,202 | France | Dec. 12, 1955 |

OTHER REFERENCES

"NH Sees Cut in Piggyback Costs," in Railway Age, March 7, 1955, pages 45, 46, and 47. (Copy available in Class 105—368.5, Division 34.)